United States Patent Office 3,492,596
Patented Jan. 27, 1970

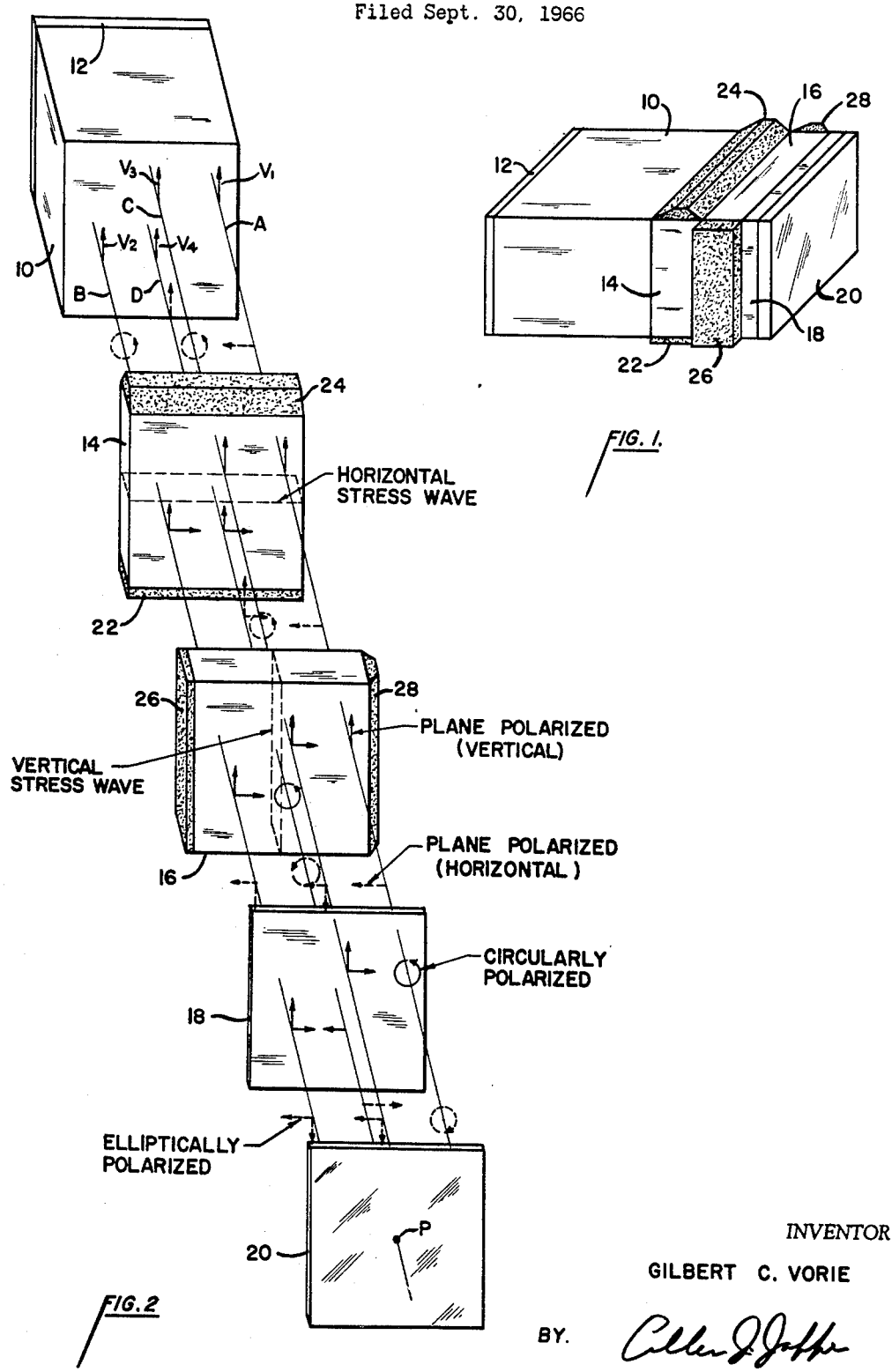

3,492,596
LASER SCANNER
Gilbert C. Vorie, Elma, N.Y., assignor to Cornell Aeronautical Laboratory, Inc., Buffalo, N.Y., a corporation of New York
Filed Sept. 30, 1966, Ser. No. 583,370
Int. Cl. H01s 3/10
U.S. Cl. 331—94.5            5 Claims

ABSTRACT OF THE DISCLOSURE

A laser scanner having a laser cavity, end reflecting surfaces, isotropic plates between the reflecting surfaces, transducers on the plates for generating sequentially propagating stress waves in the plates and a retardation plate between the reflecting surfaces.

---

This invention relates to a laser apparatus and more particularly to an apparatus for controlling a laser whereby selective spatial excitation permits spatial variation of output within the laser aperture.

The laser technology has expanded rapidly in the past several years with much effort expended in laser development. Potential applications which have stimulated research are oriented toward navigation, communications, displays and computers, and have probably been the key long-range purposes for laser development.

While component technology has been bursting wi h developments, new methods of adapting the components to potential applications have slowly progressed. Acoustic and ultrasonic deflection techniques, to date, have accomplished only a few degrees of laser deflection, and then with extremely large power requirements.

The present invention provides a laser that is capable of firing sequentially in a scanning manner across the total output aperture, the multiple narrow filament beams emanating from which can be deflected quite easily with appropriate optics.

It is accordingly a principal object of the present invention to provide a laser and a method of excitation thereof to produce a narrow beam of laser light that is capable of scanning the laser output aperture at very high rates.

Another object of the present invention is to provide a laser scanner without any moving parts.

A still further object of the present invention is to provide a highly efficient laser scanner that develops giant pulses within the laser output aperture.

These and other objects and advantages of the present invention will become apparent as the description thereof proceeds.

Basically, the present invention provides control means incorporated within the laser optical cavity which causes the polarization vectors of the spontaneously emitted photons to be rotated out of the preferential plane to thereby prevent stimulation of the excited atoms, i.e., Q-spoiling. The control means then operates to rotate the polarization vectors back into the preferential plane in a precisely controlled manner whereby lasing occurs at selected spatial points within the laser output aperture.

For a fuller understanding of the present invention, reference should be had to the following detailed description of the same taken in conjunction with the accompanying drawings wherein:

FIGURE 1 is a schematic pictorial view of a preferred embodiment of the invention, and FIGURE 2 is an exploded schematic view of the elements shown in FIGURE 1 for illustrating the construction and operation of the present invention.

Referring now to the drawings, and more particularly to FIGURE 1, a laser crystal 10 which might typically be a cut, ruby crystal is shown as being generally rectangular in shape and having at one end a totally reflecting mirror 12. Suitably pumping structure (not shown) will extend sidewise of the crystal, as is conventional. Fixed to the other end of the crystal, is a plate 14 of isotropic material which under stress becomes anisotropic, as for example, fused silica. An identical plate 16 is fixed to plate 14 on a face thereof remote from crystal 10. Adjacent plate 16 and fixed thereto is a quarter wave retardation plate 18 of mica, for example. A partially reflecting mirror 20 is fixed to plate 18 and constitutes the laser output window.

Mounted along a horizontal bottom edge of plate 14 is a shear mode transducer 22, of conventional design. Arranged along its upper horizontal edge is an absorber 24 made of any suitable high acoustical loss material such as lead. A similar transducer 26 is mounted along a vertical side edge of plate 16 and an absorber 28 is mounted along the other vertical side edge thereof. The transducers 22 and 26 may be of piezoelectric material and function respectively to generate horizontally oriented and vertically oriented stress waves in plates 14 and 16. These stress waves thus scan plate 14 vertically and plate 16 horizontally. It is important to note that since the transducers are shear mode oriented, the compression and tension axes of the acoustic waves as they transverse plates 14 and 16 make an angle of 45° with the vertical. Also, for reasons to become apparent hereinbelow, the stress axis of quarter wave plate 18 is chosen to be 45° with respect to the vertical.

As can be seen, the elements thus far described form a unit that is adapted to be housed within the laser cavity together with the laser pumping structure (not shown).

In operation, as the laser 10 is pumped by conventional means (not shown) the excited atoms thereof start to spontaneously emit photons as they drop to lower energy levels. The E vectors of those photons lie in parallel vertical planes. The photons are reflected from mirrored surface 12 and pass through plate 14. Referring to FIGURE 2, four photon or light rays A, B, C, and D are chosen to illustrate the manner of operation of the present invention. As shown, these spontaneously emitted rays all have E vectors; $V_1$, $V_2$, $V_3$, and $V_4$ oriented vertically as they leave crystal 10. The remaining excited atoms in crystal 10 that have not yet begun to spontaneously emit photons can only be stimulated easily by photons having E vectors lying in the same plane as the spontaneously emitted photons. If the E vectors are rotated out of this plane, called the preferential plane, the atoms cannot be easily stimulated. This is the principle upon which Q-spoiling is based. Assuming that, at a given instant, the horizontal stress wave generated by transducer 22 lies midway between 22 and 24 and the vertical stress wave generated by transducer 26 lies midway between 26 and 28, it can be seen that the intersection of the two stress waves lies in the center of plates 14 and 16. The projection of this intersection lies in the center of laser output aperture 20 at P.

Ray A as it leaves crystal 10, passes through plate 14 outside the instantaneous location of the horizontal stress wave. Inasmuch as plate 14 is isotropic throughout except at the stress wave, the E vector of ray A experiences no change when passing therethrough and thus, still remains vertical or plane polarized. Similarly, when passing through plate 16 outside of the vertical stress wave, ray A experiences no change, as shown. As stated earlier, the stress axis of quarter wave plate 18 makes an angle of 45° with respect to the polarization plane of rays A, B, C, and D; it therefore causes ray A to become circularly polarized as said ray leaves plate 18, as shown. Ray A is then reflected from mirror 20 experiencing a 180° change in phase with no change in polarization as shown by the dotted lines. Note that all rays traveling toward crystal 10 are shown by dotted lines. Ray A then passes again through quarter wave plate 18 where it again experiences a change from circular to plane polarization; only this time the plane of polarization is horizontal instead of vertical. This is due to the 180° phase shift caused by mirror 20. Horizontally plane polarized ray A then passes through the isotropic portions of plates 16 and 14 without experiencing any change in polarization; and since the E vector thereof is now rotated out of the vertical polarization plane or the preferential plane of crystal 10, it is no longer capable of easily stimulating the excited atoms to cause lasing.

Referring now to the round trip of ray B, it can be seen ray B will pass through the instantaneous horizontal stress wave of plate 14. Unlike ray A, ray B will experience a change in polarization, since as pointed out earlier, the stress axis of plate 14 makes a 45° angle with respect to the preferred plane of polarization. The form that ray B takes upon leaving plate 14 depends upon the phase difference between the ordinary and extraordinary rays within the plate, which in turn depends upon the magnitude of the voltages driving transducer 22 as is well known. This magnitude is chosen to introduce a 45° phase shift which causes ray B to become elliptically polarized as it emerges from plate 14. Ray B passes unchanged through the isotropic portion of plate 16 and quarter wave plate 18. Ray B is then reflected from mirror 20 and experiences a 180° phase shift with no change in polarization. As before, ray B undergoes no change in passing through plate 16. However, after passing through the stress wave of plate 14 it becomes circularly polarized due to the 45° phase difference between the ordinary and extraordinary waves within plate 14. The circularly polarized ray emerging from plate 14 is reduced to one-half power as seen by atoms of crystal 10.

The round trip of ray C is similar to that of ray B except that changes in polarization occur in plate 16 instead of plate 14. Thus, it can be seen that ray C returning back into crystal 10 cannot easily stimulate the excited atoms therein.

Referring now to ray D which passes through the intersections of the horizontal and vertical stress waves, it can be seen that said ray experiences three changes in polarization in each direction. One change occurs upon passage through plate 14 from vertically plane polarized to elliptically polarized and then from elliptically polarized to circularly polarized upon passage through plate 16. The third change, from circularly polarized to horizontally plane polarized, occurs through quarter wave plate 18. The horizontally plane polarized ray D is reflected from mirror 20 and undergoes a 180° change only in polarization vector. The ray then passes through plate 18 where it experiences a change to circular polarization. The circularly polarized ray D passes through plate 16 where it becomes elliptically polarized. Finally, passage through plate 14 changes the ray to a vertically plane polarized wave which being in the preferred excitation plate of the laser 10, will stimulate the atoms along the wave line to emit photons thereby causing lasing to occur only along said wave line.

Thus for the example given, a ray of laser light will emerge from aperture 20 at point P. As is apparent, the location of point P is varied according to the variations in intersections between the horizontal and vertical stress waves. It therefore can be seen that a beam of laser light can be precisely controlled to scan the total area of the laser 10.

As is obvious, the various scanning patterns can be developed by varying the speed of the stress waves in photoelectric plates 14 and 16. Moreover, it is not necessary to use horizontal and vertical transducers. For example, two vertical transducers sending stress waves in opposite directions at the appropriate rates will produce a stationary line wave of laser light.

In addition to scanning, it is quite obvious that the present apparatus can be used to generate giant pulses within the output aperture by optically reducing the laser beam aperture to less than the stress waves aperture, thus stimulating the total laser aperture simultaneously.

These and other modifications may suggest themselves to those skilled in the art without departing from the spirit of the present invention. The embodiment illustrated is thus not intended to be limitative of the invention, the scope of which is to be measured by the appended claims.

What is claimed is:
1. A laser scanner comprising:
   (a) laser means having reflecting mirrors at each end,
   (b) control means of isotropic material intermediate said mirrors,
   (c) energizing means for generating a sequentially propagating stress wave which traverses said isotropic material causing only the traversed portions thereof to become anisotropic until the stress wave passes whereupon said material returns to its isotropic state, and
   (d) retardation means intermediate said mirrors for changing the polarization plane of light incident thereagainst.
2. The scanner according to claim 1 wherein:
   (e) said control means comprises at least two plates, and
   (f) said energization means comprises at least two shear mode transducers mounted on said plates.
3. The scanner according to claim 2 wherein:
   (g) one of said shear mode transducers is mounted along a vertical edge of one of said plates, and
   (h) the other of said shear mode transducers is mounted along a horizontal edge of the other of said plates.
4. The scanner according to claim 1 wherein:
   (e) said laser means generates plane polarized light,
   (f) said control means comprises a plurality of plates,
   (g) said energizing means comprises a plurality of shear mode transducers mounted on said plates for generating traveling stress waves in said plates,
   (h) the stress axis of said stress waves being 45° with the plane of said plane polarized light, and
   (i) said retardation means comprising a quarter wave plate located intermediate said control means and one of said reflecting mirrors said quarter wave plate having a stress axis making 45° with respect to said polarization plane.
5. The scanner according to claim 4 wherein:
   (j) said shear mode transducers are mounted along vertical and horizontal edges of said plates, respectively.

References Cited

UNITED STATES PATENTS

| | | | |
|---|---|---|---|
| 3,366,792 | 1/1968 | Ohm | 331—94.5 |
| 3,407,364 | 10/1968 | Turner | 331—94.5 |
| 3,392,235 | 7/1968 | Miller | 331—94.5 |

JOHN KOMINSKI, Primary Examiner

U.S. Cl. X.R.

350—149, 150